United States Patent

Shaw

Patent Number: 5,351,366
Date of Patent: Oct. 4, 1994

[54] END CLAMP HIGH TENSILE MODULUS TEXTILE ROPE

[75] Inventor: Charles R. Shaw, Twinsburg, Ohio

[73] Assignee: Esmet, Inc., Canton, Ohio

[21] Appl. No.: 728,517

[22] Filed: Jul. 11, 1991

[51] Int. Cl.⁵ .............................................. F16G 11/05
[52] U.S. Cl. .................. 24/122.6; 24/136 R
[58] Field of Search ............. 24/136 R, 122.6, 115 M, 24/114.5; 403/275

[56] References Cited

U.S. PATENT DOCUMENTS

| | | |
|---|---|---|
| 222,125 | 12/1879 | Brady . |
| 508,587 | 11/1893 | Trumbull . |
| 831,548 | 9/1906 | Fleeger . |
| 1,855,227 | 4/1932 | Fiege . |
| 2,237,618 | 4/1941 | Weatherford ................ 403/275 |
| 2,266,357 | 12/1941 | Cooke . |
| 2,533,064 | 12/1950 | Streader . |
| 3,100,924 | 8/1953 | Trier et al. .................... 24/122.6 |
| 3,475,795 | 11/1969 | Youngblood ................. 24/122.6 |
| 3,820,832 | 6/1974 | Brandestini et al. . |
| 3,952,377 | 4/1976 | Morell . |
| 4,509,233 | 4/1985 | Shaw . |
| 4,640,179 | 2/1987 | Cameron . |
| 4,755,076 | 7/1988 | Salama et al. ................. 403/275 |

FOREIGN PATENT DOCUMENTS 2091770 8/1982 United Kingdom ............... 24/122.6

OTHER PUBLICATIONS

Advertising Catalog—Synthetic Rope Fittings Superior Switchboard & Devices (undated).

Primary Examiner—James R. Brittain
Attorney, Agent, or Firm—Michael Sand Co., L.P.A.

[57] ABSTRACT

An improved end clamp for a multi-strand aramid rope has an outer sleeve formed with an internal bore having a taper of between 1¼ degrees and 1¾ degrees. A tapered wedging plug having a taper of between 2¼ degrees and 2¾ degrees is inserted into the sleeve bore and compresses separated equi-spaced strands of the rope therebetween in essentially tangential contact. An annular clearance space is formed between the larger end of the sleeve bore and the larger end of the tapered plug and has an area substantially equal to or slightly less than the area of the aramid material of the rope whereby the separated strands of the rope are in abutting engagement throughout the annular clearance space to increase the holding capability of the clamp. The ratio of the tapered plug length to the diameter of the uncompressed rope varies from about 9 to 1 and 11 to 1.

18 Claims, 2 Drawing Sheets

END CLAMP HIGH TENSILE MODULUS TEXTILE ROPE

BACKGROUND OF THE INVENTION

1. Technical Field

This invention relates to an improved rope clamp and, more particularly, to a rope clamp for a terminating end of a high tensile modulus textile rope such as one comprised of multi-strand plastic fibers. Preferably the textile rope is formed of one or more sheaths of fibrous plastic material such as aramid fibers constituting a lightweight line capable of carrying extremely heavy loads. Such rope is widely used by rescue workers, fireman and in various safety and emergency applications. The rope is also frequently used in certain military and marine applications, the rope being resistant to severing, chemicals, shock and the like, it being particularly valuable for aircraft and marine applications due to its great strength and lightweightness.

2. Background Information

Previously, composite ropes fabricated of both metallic and plastic materials into multi-layered flexible lines have been well-known for use in survival-type situations as well as in mountaineering and other hazardous conditions. Such composite ropes are normally formed having a metallic core and one or more outer sheaths of fibrous plastic material. The nylon, polyester or other synthetic material used in the manufacture of such ropes may melt or burn or may be so severely weakened that the rope becomes unsafe for further use. Such composite ropes having a metallic core are not easily assembled around stable terminating fixtures and require an improved terminating end clamp to join the rope to a suitable fitting such as a clevis, yoke or other rope terminating member. U.S. Pat. No. 1,855,227 to Fliege discloses a single wedging plug employed in an inner-conical recess of a sleeve member to clamp a metallic cable to a clevis or turnbuckle. Also co-pending U.S. patent applications entitled "End Clamp for Textile Rope with a Metallic Core", Ser. No. 07/518,572, filed May 3, 1990, now U.S. Pat. No. 5,022,780, issued Jun. 11, 1991, and co-pending application, entitled "End Clamp for Composite Rope", Ser. No. 07/603,315, filed Oct. 25, 1990, U.S. Pat. No. 5,136,755, issued Aug. 11, 1992, are pertinent to the present application, both applications relating to end clamps for composite ropes having a metallic core and outer plastic sheaths. These applications are owned by the same common assignee as the present application.

While composite plastic ropes having a metallic core are particularly desirable for certain applications which utilize the best properties of the outer plastic sheath and the metallic core, there are other applications for all plastic ropes which are formed of multi-strand fibrous materials such as aramid fibers to provide lightweight and great strength for numerous applications. End clamps for such fibrous plastic materials are needed to securely retain the end of such ropes with great durability and stability for their attachment to permanent fixtures and structures.

Aramid fibers are particularly valuable for forming high tensile modulus plastic ropes. Two types of aramid fibers are primarily used for forming such ropes, the first being comprised of heat-resistant fibers, such as Nomex and Conex, and ultra high-strength high-modulus fibers, such as Kevlar and Arenka. Such fibers are relatively expensive compared to other synthetic fibers such as nylon and polyester, however, aramid fibers have particularly unique physical properties which make them highly desirable for forming plastic ropes. The aramid fibers provide improved heat resistance, flame resistance, and dimensional stability which are useful in reinforcing fire hose and V-belts. Also, ultra high-strength, high tensile modulus aramid fibers are used as the tire cord in tire carcasses and as the belt in bias-belted and radial-belted tires, V-belts, cables, parachutes, body armour, and the like.

Aromatic polyamides are formed by reactions that lead to the formation of amide linkages between aromatic rings. In practice, the aramid fibers are formed by the reaction of aromatic diamines and aromatic diacid chlorides in an amide solvent. From solutions of these polymers it is possible to produce fibers of exceptional heat and flame resistance and fibers having excellent to remarkable tensile strength and modulus. Due to the physical property differences between fibers of aromatic and aliphatic polyamides being greater than those between other existing generic classes of fibers, a new generic term for fibers from aromatic polyamides was adopted. The generic term "aramid" was adopted in 1974 by the U.S. Federal Trade Commission for fibers of the aromatic polyamide type. Aramid is a manufactured synthetic fiber in which the fiber-forming is a long chain synthetic polyamide in which 80% of the amide (—CO—NH—) linkages are attached directly to aromatic rings. Aramid fibers and their properties are further defined in Volume 3 of the 24 Volume Series entitled "Encyclopedia of Chemical Technology", pages 213-240, describing the chemical and physical properties and commercial products formed from aramid fibers.

Three other types of such a high tensile modulus textile rope are sold under the trademarks, TWARON, TECHNORA and VECTRAN and are formed of aramid fibers and fibers very similar thereto. These rope of a high tensile modulus of $9 \times 10^6$ psi and above as compared to other types of synthetic fiber ropes which may have a tensile modulus approaching $2 \times 10^6$ psi.

It is known that exposure to chemicals can cause the degradation of ropes formed of synthetic plastic materials and ultimately cause their failure. Ropes which have been subjected to such exposure are frequently discarded and not used further as a precautionary measure if subjected to one or more of a wide variety of chemicals. This may be true where chemicals are found on the ground where the rope has been lying and been exposed to such chemicals. The subject aramid fibers for forming the plastic rope of the present invention and its end terminating clamp are exceptionally resistant to a wide variety of chemicals without degradation or loss of strength.

Many known types of composite ropes or cables are difficult to terminate or otherwise manipulate due to their elastic and unwieldy nature. In most cases, a durable secure termination cannot be regularly made with the plastic rope which will cinch tightly enough to hold and provide safe connection of the line for extremely heavy loads and it is normally difficult to increase the diameter of the rope by doubling it to facilitate grasping of the rope. Various types of mechanical terminations of the rope at its end to interconnect with various types of metallic fittings have not been particularly satisfactory, especially where the lines are utilized for heavy loads, commensurate with their full load-carrying capability.

The aforesaid aramid or high tensile modulus fibers are capable of forming plastic ropes having significant dimensional stability where a permanent end clamp is highly desirable.

SUMMARY OF THE INVENTION

It is an object of this invention to provide an improved rope clamp for a lightweight manipulatable readily-grasped plastic rope of relatively high strength for use by personnel involved in a wide variety of rescue and safety applications. The clamp is particularly useful with a synthetic rope comprised of aramid fibers having great durability and dimensional stability and which will withstand exposure to elevated temperatures, sharp objects, chemicals, sunlight, or shock and which do not produce failure in the rope or require its premature disposal. The clamp is relatively simple in construction, does not require any special skill to assemble, and provides an elongated tapered wedging element for the individual frayed elements of the multi-strand rope, the fibers being aligned in essentially abutting relation to fill the annular space between the spaced-apart wedging elements of the clamp. The clamp exhibits great strength and is capable of withstanding loading substantially equal to or greater than the actual breaking strength of the fibrous rope.

It is another object of this invention to provide a rope clamp which is capable of securely retaining the frayed fibers of plastic aramid material comprising the rope which fibers are separately restrained in permanently clamped durable relation and which are resistant to axial movement of the rope by permanent restraint of the individual fibers.

A more specific object of this invention is to provide an improved rope clamp for attachment to the terminating end of a multi-strand plastic rope formed of aramid fibers. The clamp includes an elongated tubular outer sleeve having entrance and exit ends and formed with an internal bore, the bore having both a cylindrical section and a tapered section diverging toward the exit end, the taper ranging from between about $1\frac{1}{4}$ degrees and $1\frac{3}{4}$ degrees. A tapered plug is slidably mounted within the tapered section of the sleeve through the exit end for clamping the equi-spaced separated strands of the multi-strand rope between the tapered surfaces of the plug and sleeve, the plug taper being within the range of about $2\frac{1}{4}$ degrees and $2\frac{3}{4}$ degrees, the plug forming an annular clearance area between the tapered surfaces of the plug and sleeve which is substantially equal or slightly less than the compressed cross-sectional area of the multi-strand rope. The ratio of the tapered plug length to the uncompressed rope diameter ranges from about 9 to 1 to 11 to 1, the plug and sleeve body having a lesser overall diameter than comparable elements used in previous clamps.

The present invention relates to a durable end clamp for a plastic rope wherein the rope is formed of heat resistant and flame resistant aramid fibers wherein the separated fiber strands are held in abutting uniformly-distributed relationship between the tapered plug and tapered sleeve of the clamp. Other objects and advantages of the subject rope end clamp will be readily apparent from the following description, drawings and claims.

BRIEF DESCRIPTION OF THE DRAWINGS

A preferred embodiment of the invention illustrative of the best mode in which the inventor has contemplated applying the principle set forth in the following description, is set forth in the drawings and is particularly and distinctly pointed out and set forth in the appended claims.

Similar numerals refer to similar parts throughout the drawings.

DESCRIPTION OF THE PREFERRED EMBODIMENT

The most commonly used plastic rope with which the subject rope clamp may be employed is a multi-strand rope comprised of a plurality of similar high tensile modulus aramid fibers. Aramid fibers are particularly useful in forming plastic ropes. As stated, two types of aramid fibers, namely, heat-resistant fibers sold under the trademarks NOMEX and CONEX and ultra high-strength high-modulus fibers sold under the trademarks KEVLAR and ARENKA, are particularly useful in practicing the present invention when formed into multi-strand ropes of various sizes. Other examples were previously set forth by the trademark identification thereof. The ultra high-strength high tensile modulus fibers are commonly used where the strongest plastic elements are needed, such as for tire cord in tire carcasses and as the belt in bias-belted and radial-belted tires, V-belts, cables, parachutes, body armour and the like.

Figure 1:
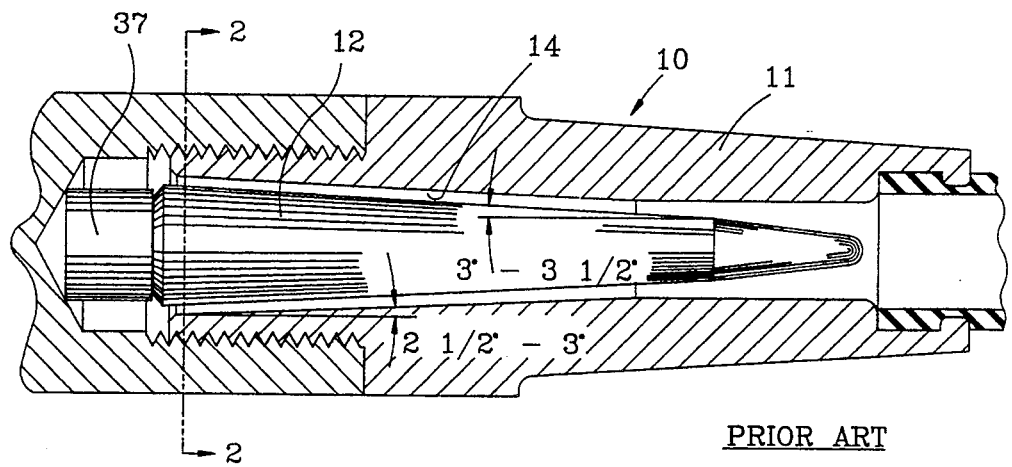
FIG. 1 is a vertical sectional view of a rope clamp of the prior art without the rope being shown therein, wherein the juxtaposed tapering surfaces of both the plug and outer sleeve have substantially greater degrees of taper.
Figure 2:
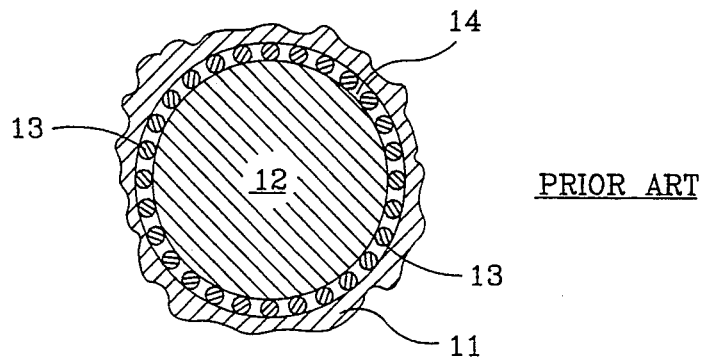
FIG. 2 is a vertical sectional view taken through the rope clamp FIG. 1 showing the individual fibers of the plastic rope separated more widely within the annulus between the greater tapered surfaces of the plug and outer sleeve of the prior art clamp.

With reference to FIG. 1 of the drawings, the prior art rope clamp 10 illustrated therein has utilized an outer sleeve 11 having a tapered bore on its inner surface ranging in taper from about $2\frac{1}{2}$ degrees to 3 degrees with a complemental internal wedging plug 12 having a taper on its outer surface ranging from about 3 degrees to $3\frac{1}{2}$ degrees. FIG. 1 shows the open annulus 14 between the outer sleeve and tapered plug members without the plastic rope in place to show the relative taper between the juxtaposed surfaces. Such clamp 10 has previously engaged the separated frayed plastic fiber strands 13 of the rope in relatively widely-spaced arrangement such as shown in FIG. 2 wherein considerable open space remains between the complementally tapered surfaces and the individually restrained fibers. Such clamp having generally complementally tapered surfaces with each having greater taper, exhibits considerably lesser holding strength than the rope clamp of the present invention such as shown in the remainder of the drawings. The wide spacing between the separated fiber strands 13 and the greater degree of taper detracts from the holding power created by the mated wedging elements.

Figure 3:
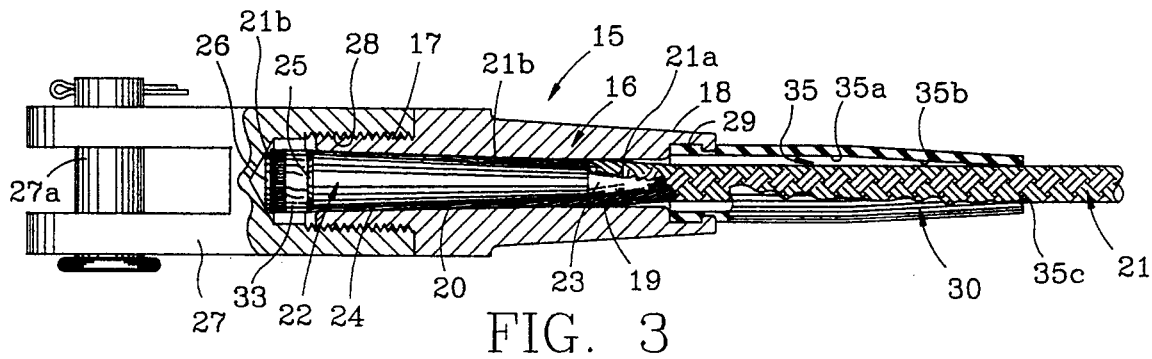
FIG. 3 is an elevational view of the subject rope clamp of the present invention partially in vertical section showing the outer sleeve having a tapered interior surface and tapered plug engaging the frayed fibers of the plastic rope, the clamp having an attachment clevis member at one end and an elastomeric sleeve member at the other end.
Figure 4:
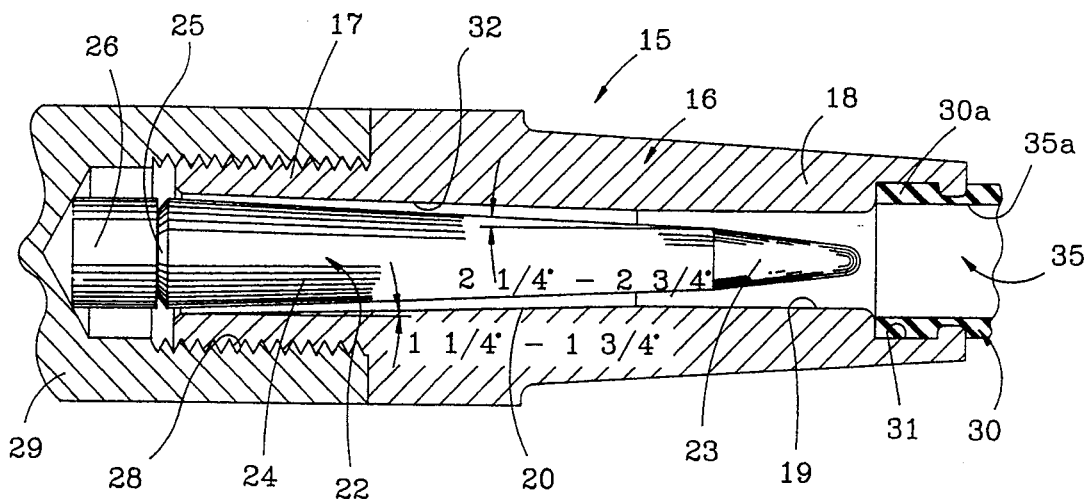
FIG. 4 is a enlarged vertical sectional view of the rope clamp of the present invention showing the ranges of taper of the outer sleeve and plug members forming an open annulus therebetween without the rope end in place, with a modified end attached thereto.

In the preferred embodiment of the present invention, the rope end clamp 15 as shown in FIG. 3 is comprised of an elongated tubular metallic sleeve 16 having both threaded and unthreaded exterior surfaces 17 and 18 respectively, on its outer surfaces. The central bore of hollow sleeve 16 has both a cylindrical section 19 and a tapered section 20, its smaller end extending toward the entrance end of the sleeve into which the plastic rope 21 is fitted. The sleeve member 16 is preferably comprised of metal, such as aluminum or steel or other metal having considerable strength comparable to the rope. In accordance with one of the main features of the invention, the inner tapered surface 20 of the sleeve has a taper ranging from about $1\frac{1}{4}$ degrees to about $1\frac{3}{4}$ degrees enlarging away from the cylindrical surface 19 toward the exit end of the sleeve.

The high tensile modulus textile rope to be fitted within the end clamp 15 is indicated at 21 and includes an outer jacket 21a and a plurality of individual fiber strands 21b which are uniformly divided into equispaced arrangement as they are distributed within the sleeve 16 prior to entry of a plug member 22. Jacket 21a is removed to a predetermined length, after rope 21 is inserted through an elastomeric end boot 30 and through sleeve 16. The aramid strands are unlayered for this length. Plug 22 then is inserted in the middle of the strands and the strands and plug are pulled down into the sleeve. The jacketed rope end is located at the intersection of two tapered surfaces 23 and 24 of plug 22, with tapered surface 23 capturing and holding jacket 21a.

Figure 5:
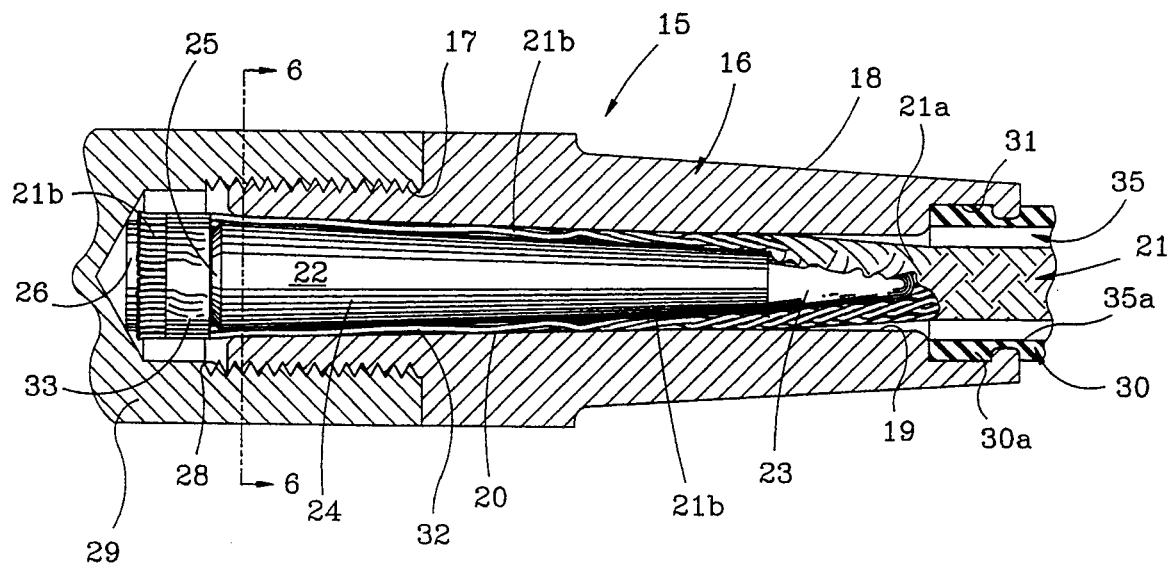
FIG. 5 is a view similar to FIG. 2 showing the abutting relationship of the separate individual plastic fiber strands aligned within the open annulus of the rope clamp shown in FIG. 4.

Wedging plug member 22 has tapered conical surfaces comparable in strength to the sleeve which is preferably formed of carbon steel. The wedging plug 22 has the two tapered conical surfaces discussed above, the leading edge 23 for entry into the outer sleeve being more sharply tapered and having a bullet-shape. In accordance with another feature of the invention, the major surface 24 of plug member 22 has a degree of taper ranging from about $2\frac{1}{4}$ degrees to about $2\frac{3}{4}$ degrees over its major exterior surfaces for entry into the sleeve member. As stated, the sleeve member 16 has both a right-cylindrical interior contour 19 at its entry end surface and a tapered contour ranging from between about $1\frac{1}{4}$ degrees to $1\frac{3}{4}$ degrees over the adjacent surface 20 diverging toward its exit end to facilitate entry of the wedging plug member 22. The preferred taper of the plug 22 is about $2\frac{1}{2}$ degrees and the preferred taper of the sleeve 16 is about $1\frac{1}{2}$ degrees. The plug extends beyond the exit end of the sleeve to facilitate locking in place the plug against the fibers within the sleeve. The ratio of tapered plug length to the diameter of the uncompressed rope varies within the range of about 9 to 1 and 11 to 1. The fibers are thus restrained in the open annulus 32 formed between the outer conical surface of plug 22 and the inner conical surface of sleeve 16, over a longer lineal length to increase holding power. Open annulus 32 has a cross-sectional area substantially equal to or slightly less than the cross-sectional area of the fibers of the rope which causes the individual strands 21a to be in abutting contact with each other as shown in FIG. 5. The plug member 22 has a chamfered end surface 25 at its larger end.

Figure 6:
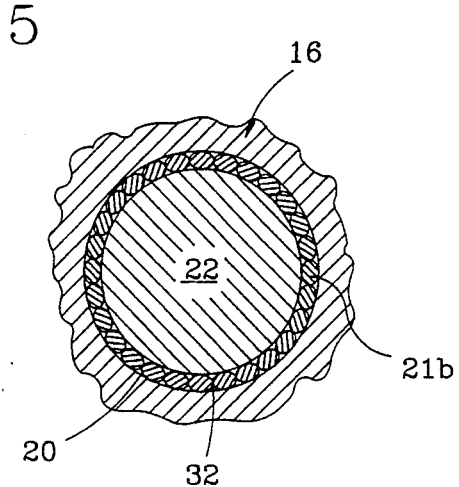
FIG. 6 is a vertical sectional view of the subject rope clamp similar to FIG. 4, with the separate fiber strands of the plastic rope in contact with each other within the open annulus between tapered outer sleeve and tapered plug members of the clamp.

In accordance with another feature of the invention, an anti-backout member 26 formed of metal and having a cylindrical shape is fitted against the terminating surface 25 of the plug at its larger end. An end cap member or clevis 27 having internal threads 28 is then threaded onto externally threaded area 17 of the outer sleeve to engage anti-backout member 26. End cap 27 exerts compressive force against the cylindrical anti-backout member 26 which in turn presses against larger end 25 of tapered plug 22 to compress the fibers between plug and sleeve. Member 26 is formed of metal so that it does not take a permanent set as is the case with plastic or elastomeric materials which form an anti-backout member 33 as shown in clamp 10 of FIG. 1. The end cap member may be a clevis 27 having a pin 27a therein as shown in FIG. 3, or a yoke or oval eye (not shown), or a closed end cap 29 as shown in FIG. 6.

The individual strands of the aramid, extend past the larger end 25 of the plug and are held in place against the outer cylindrical surface of anti-backout member 26 with tape 33 (FIGS. 3 and 5). The purpose is two fold; to prevent the strands from entanglement in the threads on assembly with member 27 and to assure that its fibers remain in place with plug member 22 as the plug is being forced down into sleeve 16. It also prevents the strands from being caught in the threads when screwing the sleeve and clevis together.

An elastomeric boot 30 having a flanged end 30a is fitted into an annular recess 31 in the smaller end of the sleeve 16 to seal the clamp end around the rope from the effects of weather and to prevent the entry of water into the clamp. The elastomeric boot is formed of durable flexible synthetic rubber having an internal diameter closely fitting the rope exterior.

A basic difference between the present invention and the prior art clamp of FIG. 1, is that the length of plug 22 and of sleeve 16 of this invention is approximately twice as long as comparable elements 12 and 11 in the prior art which are primarily used for retaining the end of metallic wire rope or a composite rope. With this increase in length, the holding efficiency of the subject clamp is greatly increased and is fully capable of holding more than 90 percent of the rated strength of the all-plastic rope. This is comparable to not more than about 65 percent holding efficiency of other types of clamps such as those for standard wire rope termination when applied to aramid ropes. In addition, such prior clamps have a distinctive tendency to loosen when subjected to vibration for any length of time. The present clamp will not loosen when subjected to intense vibration for substantial periods.

Most importantly, decreasing the wedging angle to about $1\frac{1}{2}$ degrees within the sleeve body and about $2\frac{1}{2}$ degrees for the plug element, along with the longer length of the facing retentive surfaces, dramatically reduces the tendency of the clamp to loosen during vibration. Also it provides a clamp which is much smaller in exterior diameter which is desirable in most applications. Smaller annulus 32 which is formed between the juxtaposed surfaces, i.e. the outside diameter of the plug and the inside diameter of the sleeve body, due to the smaller tapers than the prior art clamps, compacts the individual strands 21b of the aramid fibers much closer together than the prior art. The strands are caused to be pressed closer together in tangential contact with each other FIG. 6, thus providing a load sharing between strands and an increase of friction therebetween. This friction increase and load sharing, increases the overall efficiency of the holding power of the clamp even in an imperfect assembly, where each strand may not be equally wedged by the plug against the inside taper of the sleeve body. The load sharing, by compacting the strands together, has shown in testing to increase the holding efficiency from a maximum of 90 percent rope strength using prior art clamps, to a maximum of about 95 to 111 percent of rope strength using the present clamp. It is believed that the frictional forces resulting between the contacting strands provides this increased holding power.

As a typical example, a No. 1500 denier of aramid fiber has a cross section of 0.000172 square inches and has a strength of about 55 pounds. An 8,000 lb. tensile rope would normally be comprised of about 146 of such #1500 denier fibers for a total cross section of about 0.025 square inches. When the fibers are joined into a rope having a circular cross section and about 0.29 inch diameter, the cross-sectional area is about 0.066 square inches. This indicates that the rope is then about 38 percent aramid fibers and the remainder, open space or air.

Major clearance areas between the plug and sleeve body for various types of clamps to hold the aforesaid rope are as follows.

In the prior art, 0.040 square inches annular clearance area, or 60 percent of the uncompressed rope area, but 0.40/0.025 or 160 percent of the compressed aramid fiber area permits a substantial amount of gap or open space between the individual fibers.

In using the present clamp, 0.0233 square inches annular clearance area or 35 percent of the rope area, but 0.023/0.025 or 92 percent of the solid fiber area permit essentially no amount of gap or openings between individual fibers.

The subject clamp has exhibited a clearance ratio in the open air annulus area of the clamp of about 30 to 40 percent of the cross-sectional rope area on 8 different rope sizes varying from 3/16 inch diameter to 5/8 inch diameter. Breaking strengths were found to extend from about 95 to 111 percent of the rated breaking strength of the individual ropes. This is a very significant increase in strength over prior art clamps exhibiting at best a 90 percent maximum holding strength compared to rope strength.

Another significant improvement over prior art clamps is the use of anti-backout plug 26 within the clamp assembly. Such plug is a cylindrical member or bar which fits between the large end of the plug and the inner surface of the end cap or so-called socket adaptor. When the socket adaptor is threaded onto the sleeve body, the anti-backout plug presses against the plug preventing it from loosening until the rope assembly is loaded in use. Previously, prior art clamps have utilized a plastic or elastomeric anti-backout plug 37 (FIG. 1), where in the present clamp such anti-backout plug is comprised of metal. The prior plastic or elastomeric plugs 37 have been found to take a compression set with time and lose their ability to press against the tapered plug. Metallic plug 26 of this invention does not take a permanent set and does not loosen with time but exerts a permanent compression on the tapered plug to firmly retain the rope fibers.

The elastomeric boot 30 which fits over the plastic rope adjacent its restrained end is provided to create bending strain relief of the rope adjacent the clamp and a water seal for the outer jacket of the rope. The elastomeric boot has a flanged end which fits within a complementally contoured recess 31 of the sleeve body to provide weather resistance to prevent water from entering the clamp. Furthermore, boot 30 has an internal bore 35 with a cylindrical section 35a adjacent the entrance end of boot 30 and a tapered section 35b converging toward entrance end 35c thereof. This tapered section can be cut to a desired length to insure a tight weather-resistance relationship with rope 21.

Accordingly, the improved end clamp for textile rope is simplified, provides an effective, safe, inexpensive, and efficient device which achieves all the enumerated objectives, provides for eliminating difficulties encountered with prior devices, and solves problems and obtains new results in the art. It also is understood that the end clamp of the present invention could be suitable for terminating ropes formed of a reduced tensile modulus than the preferred high tensile modulus fibers discussed above, if desired.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved end clamp for a plastic rope is constructed and used in several forms, the characteristics of the construction, and the advantageous, new and useful results obtained; the new and useful structures, devices, elements, arrangements, parts and combination, are set forth in the appended claims.

I claim:

1. A clamp for attachment to the terminating end of a rope formed of aramid fibers including:
   a) an elongated tubular outer sleeve having entrance and exit ends and formed with an internal bore, said bore having a first cylindrical section adjacent the entrance end and substantially complementary to the size of a rope to be attached and a second tapered section formed by a tapered inner surface diverging toward the exit end, said taper being within the range of between $1\frac{1}{4}$ degrees and $1\frac{3}{4}$ degrees;
   b) a plug having a tapered outer surface slidably mounted within the tapered section of the sleeve through the exit end of said sleeve for clamping separated strands of a rope between said tapered outer surface of the plug and the tapered inner surface of the sleeve, said plug taper being within the range of between $2\frac{1}{4}$ degrees and $2\frac{3}{4}$ degrees; and
   c) said plug forming an annular clearance area between the outer surface of the plug and the tapered inner surface of the sleeve at the exit end of said sleeve substantially equal to or slightly less than the compressed area of a rope.

2. The clamp defined in claim 1 in which the angle of taper of said plug is 2½ degrees; and in which the angle of taper of the internal surface of said sleeve is 1½ degrees.

3. The clamp defined in claim 1 in which the clamp includes attachment means removably mounted on the exit end of the outer sleeve for attaching the clamp to a termination structure.

4. The clamp defined in claim 3 in which the exit end of the outer sleeve has an externally threaded area and the attachment means has an internally threaded opening threadably engaged with said sleeve threaded area for removably mounting the attachment means to the sleeve.

5. The clamp defined in claim 4 in which said tapered plug extends outwardly beyond the exit end of said sleeve and into the internally threaded area of the attachment means.

6. The clamp defined in claim 4 in which a metallic anti-backout plug is located within the opening of the attachment means and is maintained in pressure engagement with the tapered plug by the threaded engagement between the sleeve and attachment means to bias the tapered plug toward the entrance end of the sleeve.

7. The clamp defined in claim 3 in which the attachment means is a clevis, eye or stud adaptor.

8. The clamp defined in claim 1 including a tubular elastomeric boot attached to the entrance end of said sleeve and adapted to receive a rope therethrough to provide strain relief and a water seal.

9. The clamp defined in claim 8 in which said elastomeric boot has an internal bore having a cylindrical section adjacent the entrance end of the sleeve and a tapered section converging toward an entrance end of said elastomeric boot.

10. A combination of a rope formed of high strength synthetic fibers and a termination clamp therefor including:
 a) a length of a multi-strand rope having an uncompressed cross-sectional diameter containing a predetermined compressed cross-sectional area of a fibrous material;
 b) a clamp having an elongated tubular outer sleeve and an internal bore terminating in entrance and exit ends, and a tapered plug movably mounted within the internal bore for clamping separated strands of said rope between the plug and sleeve bore, said sleeve bore having an angle of taper between about 1¼ degrees and 1¾ degrees diverging toward the exit end, and the tapered plug having an angle of taper of between about 2¼ degrees and 2¾ degrees; and
 c) an annular clearance area formed between the tapered plug and sleeve bore at the exit end of said bore substantially equal to or slightly less than the compressed cross-sectional area of the fibrous material so that the separate strands lie in substantially complete abutting engagement throughout said annular clearance area.

11. The combination defined in claim 10 in which a tubular elastomeric boot is attached to the entrance end of the sleeve and is adapted to receive the rope therethrough to provide strain relief and a water seal for said rope; and in which said elastomeric boot has an internal bore with a cylindrical section adjacent the entrance end of the sleeve and the tapered outer section converging toward an entrance end of said elastomeric sleeve.

12. The combination defined in claim 10 in which the exit end of said outer sleeve has an externally threaded area and including attachment means having an internally threaded opening threadably engaged with said sleeve threaded area for removably mounting the attachment means to said sleeve; and including a metallic anti-backout plug located within the opening of said attachment means and maintained in pressure engagement with said tapered plug by the threaded engagement between said sleeve and said attachment means to bias said tapered plug toward the entrance end of said sleeve.

13. The combination defined in claim 10 in which the annular clearance area is between about 30% to 40% of the uncompressed cross-sectional area of the rope.

14. The combination defined in claim 10 in which the internal bore of said outer sleeve has a cylindrical section adjacent the entrance end having a diameter complementary to the diameter of said rope for slidably receiving said rope thereon.

15. The combination defined in claim 10 in which the tapered plug has a pair of conical tapered surfaces; in which the rope has an outer jacket portion; and in which said jacket portion terminates at the intersection of the two tapered surfaces of the plug.

16. The combination defined in claim 15 in which the conical tapered surface of the plug at a smaller end of the plug forms a wedge to secure the jacket of the rope inside the clamp.

17. The combination defined in claim 10 in which the rope has a tensile modulus of at least $9 \times 10^6$ psi.

18. The combination defined in claim 10 in which the ratio of the tapered plug length to the uncompressed rope diameter is within the range of 9 to 1 to 11 to 1.

* * * * *